United States Patent [19]

Sando et al.

[11] 4,066,541
[45] Jan. 3, 1978

[54] PROCESS FOR TREATING WASTE WATER CONTAINING POLYVINYL ALCOHOL

[75] Inventors: Yoshikazu Sando; Hiroshi Ishidoshiro; Eiichi Nakano, all of Wakayama, Japan

[73] Assignee: Sando Iron Works Co., Ltd., Japan

[21] Appl. No.: 688,069

[22] Filed: May 19, 1976

[30] Foreign Application Priority Data

May 28, 1975 Japan .................... 50-63837

[51] Int. Cl.$^2$ .................. B01D 5/00; B01D 11/00; B01D 17/00
[52] U.S. Cl. ........................ 210/51; 210/53
[58] Field of Search ............. 210/42 R, 44, 45, 51–53, 210/55

[56] References Cited

U.S. PATENT DOCUMENTS 3,761,406  9/1973  Tsuk ........................ 210/52

Primary Examiner—Thomas G. Wyse
Assistant Examiner—David R. Sadowski
Attorney, Agent, or Firm—Toren, McGeady and Stanger

[57] ABSTRACT

A process for treating waste water containing polyvinyl alcohol (designated hereinafter as P.V.A.) comprising separation of the P.V.A. in the form of a compound with boric acid which is produced at pH 8 to 10 by a reaction with boric acid or borax added in the presence of an inorganic salt such as sodium sulfate, and using thus regenerated liquid repeatedly, and a process of utilizing waste containing P.V.A. for desizing textile.

12 Claims, 1 Drawing Figure

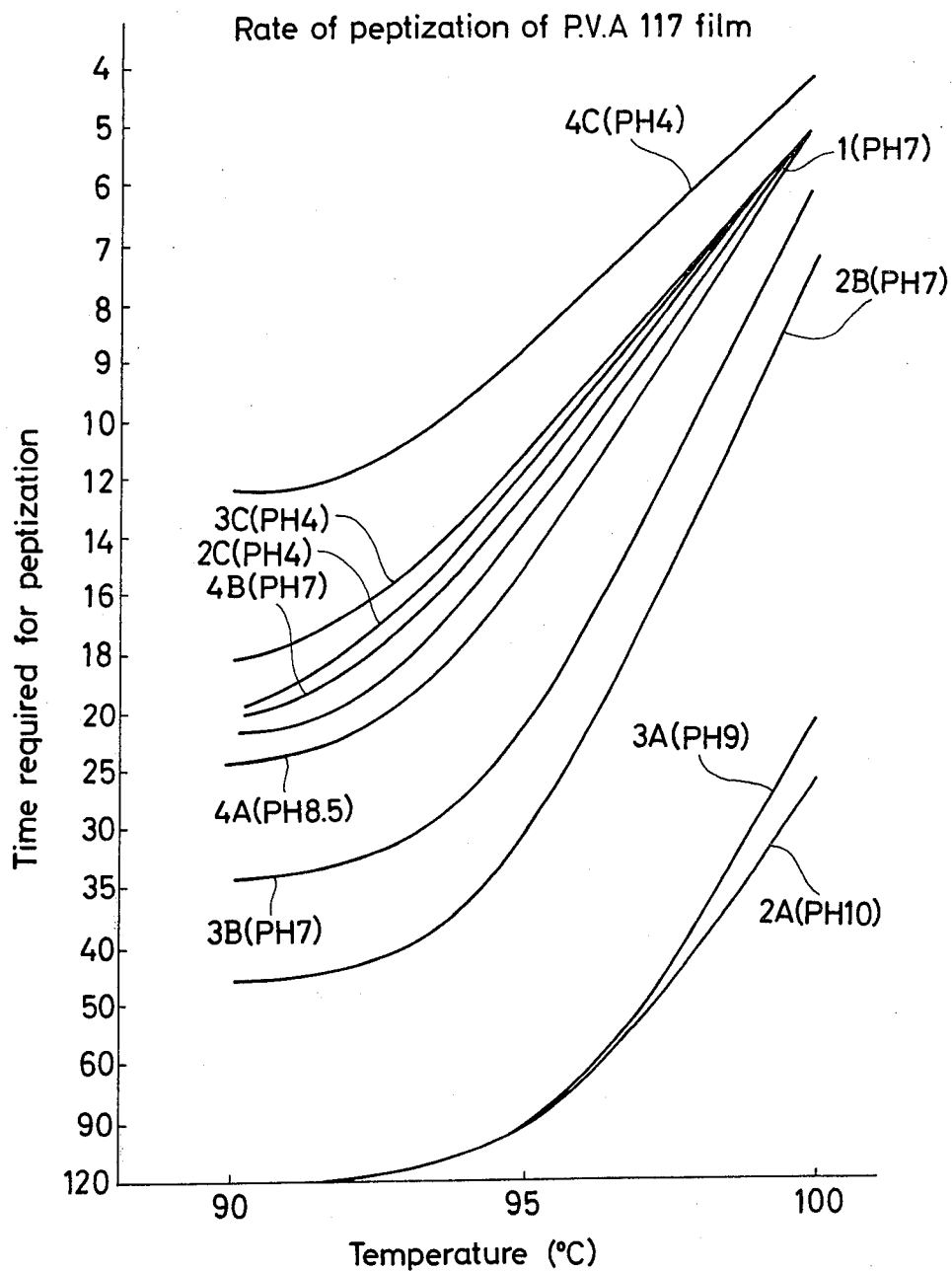

PROCESS FOR TREATING WASTE WATER CONTAINING POLYVINYL ALCOHOL

BACKGROUND OF THE INVENTION

Waste waters containing organic matters have been so far treated mostly by the activated mud method. However, polyvinyl alcohol (designated hereinafter as P.V.A.), if present in the water, is hardly decomposed by the method. It is better for such waters to be treated with boric acid or borax in the presence of an inorganic salt, for example, sodium sulfate, to coagulate and separate P.V.A. in the form of a gelatinous compound with boric acid. In this case, however, the mother liquor from which P.V.A. has been recovered contains a small amount of borate as well as inorganic salts. These salts should not be discarded, even if the amount lies within the permitted range of pollution control, from the point of recycling natural resources.

SUMMARY OF THE INVENTION

The present invention relates to a process for treating waste water containing P.V.A. It comprises treating a variety of such waste waters by the methods described above to separate and recover the P.V.A. and repeatedly using the waters thus regenerated for further use such as desizing of textiles.

To waste waters containing P.V.A., 0.1–0.2% of boric acid or borax and 0.3–0.6% of an inorganic salt such as sodium sulfate are added and the pH is adjusted to 8–10 with an oxide or hydroxide of an alkaline or alkali earth metal. This process is carried out at room temperature. When P.V.A. is the sole organic compound in the waste water, the mother liquor from which P.V.A. has been removed contains 0.05–0.08% (as boron) of borate and 0.6–1.0% of inorganic salt. On using this solution for desizing of textiles, for example, the amount of coagulator required is only 30% of that required in case of line water, or in other words addition of 0.3–0.6% does suffices. Less efficiency of desizing, that may result to some extent in this case, can be eliminated at a somewhat higher pH by elevating the temperature above 70° C. The end is successfully achieved by the process. The recovered compound of P.V.A. with boric acid can be used for wide variety of application such as processing of fiber and paper and for adhesives. The process mentioned is carried out with little cost and free from any pollution.

On the other hand, in the method described above where P.V.A. is coagulated and separated in the form of a compound with boric acid, solid impurities other than P.V.A., which are present in the water may disturb to recycle the recovered P.V.A. For example, a waste water which has come from the desizing stage of textile processing is often turbid and colored with carbonaceous matter that is produced by burning of fibers on the textile. The P.V.A. recovered from this kind of water should be impure and colored. The P.V.A. recovered by the method above absorbs both carbonaceous matters and salts on coagulation. Impure product of P.V.A. finds its use only as material for soil improvement.

Further, the present invention relates to the improvement of this drawback, to recover a high purity compound of P.V.A. with boric acid. More particularly, boric acid or borax and an inorganic salt such as sodium sulfate and ammonium sulfate are added to the waste water, and the solution at pH 4–7 is heated at a temperature to higher than 70° C, and then the pH is adjusted to 8–10 and cooled to room temperature. This treatment affords recovery of a colorless P.V.A.-boric acid compound of high purity which contains no carbonaceous matter and much less amount of salts. This process is also advantageous for a water in which P.V.A. is the sole organic matter, since the product P.V.A.-boric acid compound obtained contains less salts than otherwise. The mechanism with which the pure product is formed is considered as follows: when the weakly acid solution is heated at a high temperature, the P.V.A. is peptized completely and on cooling the solution the P.V.A. is gelatinized to coagulate in the form of a pure compound with boric acid without absorbing any carbonaceous solid matter nor any excessive salt. In this process solid impurities such as carbonaceous matter precipitate to the bottom of vessel and may be separated easily from the solution. Therefore the solution can be repeatedly used for many purposes, as has been described as the first invention.

Waste waters containing P.V.A. may often contain starches. The third invention included in the present invention relates to such waters, where the mother solution from which P.V.A. has been recovered is made neutral, and starches in it are saccharized by heating the solution above 70° C for 5–15 min. with 0.1–0.2% of an enzyme desizer added or alternatively hydrolyzed with an acid. Solid impurities such as carbonaceous matters, if present, are removed either prior to or after the saccharification treatment. Interference of starches that may takes place when the regenerated mother solution is utilized to desize textiles can be avoided. Thus, even when starches are present in the waste water, the same amount of the coagulating agent is required to separate P.V.A. as that required when the P.V.A. is the sole organic component. If the solution is repeatedly used without removing starches in it, not only the accumulated starches disturb desizing processing but also the solution becomes more and more viscous and bubbling makes it difficult to separate the P.V.A. by coagulation.

As has been mentioned above, the recovered P.V.A. as a compound with boric acid may be used for a variety of purposes. However, when it is used as an artificial sizer for textiles, presence of boric acid should be considered. Thus in this invention, a temperature higher than usual is chosen and desizing is carried out at pH 4–8 at a temperature above 70° C. The results are comparable to those when fresh P.V.A. is used.

DESCRIPTION OF PREFERRED EMBODIMENTS

The present invention will be understood more clearly from the following examples and the attached drawings which show variation of the rate of peptization of P.V.A. film with temperature and pH.

EXAMPLE 1

To a waste water containing 0.80% of P.V.A. (average degree of polymerization 1700 and degree of saponification 88%), 0.12% of borax and 0.9% of sodium sulfate were added. Then the solution was treated with lime to make the pH to 9 and agitated for 10 min. at room temperature, to separate the P.V.A. by coagulation in the form of a compound with boric acid. The composition when dried was 80.2% of P.V.A., 10.3% (as B) of boric acid and 0.20% of CaO. The mother solution at pH 7, to which 0.12% of an enzyme desizer Biotex (from Naganuma Industry, Trade Name) has been added, was used to desize T/C broad-cloths at 97°–100° C. Results obtained were the same as those when line water was used for the purpose. The waste water from the above process was treated with 0.05% of borax and 0.3% of sodium sulfate and the pH was adjusted to 9. When the resulting solution was treated for 15 min. at room temperature, a compound of P.V.A. with boric acid was separated by coagulation in the same way as before.

EXAMPLE 2

To a waste water from the desizing process of T/C broad-cloths containing 0.75% of P.V.A. and 0.4% of starch, 0.12% of boric acid and 0.7% of ammonium sulfate were added. The resulting solution was treated for 30 sec. at 98° C, then the pH was adjusted to 8 with lime and cooled to room temperature, to recover colorless P.V.A. by coagulation in the form of a compound with boric acid. The dried material was found to consist of 83.7% of P.V.A., 12.4% (as B) of boric acid, 0.04% of CaO and 0.09% of starch, while impurities such as carbonaceous matters were substantially not detected.

EXAMPLE 3

The mother solution produced in Example 2 was kept standing for a while, and the precipitates were removed. With 0.1% of added enzyme desizer Biotex (from Naganuma Industry) the solution at pH 7 was heated for 10 min. at 80° C, to saccharify the starches in it. As a result, the concentration of starch was reduced to 0.06%. Desizing of textiles by using this mother solution was performed with the same result as in Example 1.

EXAMPLE 4

To the mother solution in Example 2, 2 g/l of concentrated sulfuric acid was added. The solution was boiled for 5 min. to hydrolyze starches. When the precipitate formed was removed, the concentration of starch was found to have reduced to 0.05%.

EXAMPLE 5

Sizing of textile was performed at 80° C by using a sizing agent which was prepared from 60% of the P.V.A.-boric acid compound recovered in Example 2 and 40% of starch size. Results were the same as those obtained with commercial sizers at 50° C. Comparative tests of wearing-out of products are shown below.

| Textile | Number of threads worn out | | |
|---|---|---|---|
| | Recovered P.V.A. | Commercial Product A | B |
| 45 Single threads $T_{65}/C_{35}$ | 2664 | 3231 | 1470 |
| 100% Tetron | 3506 | 4800 | 2557 |

What is claimed is:

1. A process for treating waste water containing polyvinyl alcohol comprising reacting the polyvinyl alcohol in the waste water at a pH from 8 to 10 with a boron compound selected from the group consisting of boric acid and borax in the presence of an inorganic salt to produce a complex of the boron compound and the polyvinyl alcohol, and separating the complex therefrom.

2. The process of claim 1 wherein the inorganic salt is sodium sulfate of ammonium sulfate.

3. A process for treating waste water containing polyvinyl alcohol by adding a boron compound selected from the group consisting of boric acid and borax and an inorganic salt to the water, heating the thus formed solution above 70° C while the pH is from 4 to 7, adjusting the pH to 8 to 10 and then cooling the solution to room temperature to separate the polyvinyl alcohol in the form of a complex with the boron compound which is free from any salts and solid impurities in the waste water.

4. The process of claim 3 wherein the inorganic salt is selected from the group of sodium sulfate and ammonium sulfate.

5. The process of claim 1 wherein the amount of boron compound added is from 0.1 to 0.2 percent.

6. The process of claim 1 wherein the amount of inorganic salt added is from 0.3 to 1.0 percent.

7. The process of claim 3 wherein the amount of boron compound added is from 0.1 to 0.2 percent.

8. The process of claim 3 wherein the amount of inorganic salt added is from 0.3 to 1.0 percent.

9. The process of claim 1 wherein after the separation of the polyvinyl alcohol, any starch in the liquid is saccharified by the addition of an enzyme desizer and heating the neutral solution to at least 70° C.

10. The process of claim 1 wherein after the separation of the polyvinyl alcohol, any starch in the liquid is hydrolyzed with acid.

11. The process of claim 3 wherein after the separation of the polyvinyl alcohol, any starch in the liquid is saccharified by the addition of an enzyme desizer and heating the neutral solution to at least 70° C.

12. The process of claim 3 wherein after the separation of the polyvinyl alcohol, any starch in the liquid is hydrolyzed with acid.

* * * * *